United States Patent [19]

Nishimura

[11] Patent Number: 4,979,111

[45] Date of Patent: Dec. 18, 1990

[54] CT IMAGE PROCESSOR USING DATA EXPANSION FOR REDUCING STRUCTURAL NOISE IN REARRANGEMENT

[75] Inventor: Hiroshi Nishimura, Chiba, Japan

[73] Assignee: Hitachi Medical Corporation, Tokyo, Japan

[21] Appl. No.: 374,553

[22] Filed: Jul. 3, 1989

Related U.S. Application Data

[63] Continuation of Ser. No. 826,982, Feb. 7, 1986, abandoned.

[30] Foreign Application Priority Data

Feb. 13, 1985 [JP] Japan .................................. 60-24560

[51] Int. Cl.⁵ .............................................. G06F 15/42
[52] U.S. Cl. .......................... 364/413.16; 364/413.18
[58] Field of Search ...................... 364/413.18, 413.16

[56] References Cited

U.S. PATENT DOCUMENTS

| | | | |
|---|---|---|---|
| Re. 30,947 | 5/1982 | Boyd | 364/414 |
| 4,178,510 | 12/1979 | Wagner | 364/413.18 |
| 4,200,799 | 4/1980 | Saito | 378/13 |
| 4,274,140 | 6/1981 | Watson | 364/413.18 |
| 4,570,224 | 2/1986 | Shimoni | 364/414 |
| 4,680,709 | 7/1987 | Srinivasan | 364/414 |
| 4,682,290 | 7/1987 | Tan | 364/414 |
| 4,682,291 | 7/1987 | Renveni | 364/413.18 |
| 4,740,896 | 4/1988 | Horiba et al. | 364/413.18 |

*Primary Examiner*—Michael R. Fleming
*Assistant Examiner*—Gail O. Hayes
*Attorney, Agent, or Firm*—Sixbey, Friedman, Leedom & Ferguson

[57] ABSTRACT

A CT image processor for use in X-ray computerized tomographic system including an X-ray source for providing fan beams on an object being examined, a multichannel X-ray detector for detecting the fan beams transmitted through the object and a processor for reproducing a sectional image of the object including circuitry for obtaining a back projection of the signal obtained from the multichannel radioactive ray detectors, the processor circuitry also having means for rearranging the order of the fan beams into parallel beams and for effecting scaled-up interpolative operations based on the projected image signal so as to use the scaled-down interpolated data for the back projection.

6 Claims, 12 Drawing Sheets

CT IMAGE PROCESSOR USING DATA EXPANSION FOR REDUCING STRUCTURAL NOISE IN REARRANGEMENT

This application is a continuation of Ser. No. 06/826,982, filed Feb. 7, 1986, now abandoned.

BACKGROUND OF THE INVENTION

1. Field of the Invention

This invention relates to a CT image processor in an X-ray computerized tomograph.

2. Discussion of Prior Art

As disclosed in Japanese Patent Application Laid-Open No. 53-9494, there has been proposed a method for adjusting an object being examined so that the object may be accommodated to a maximum extent within the spread out angle of a fan beam by moving the object-arranging mechanism in an X-ray source-multi-channel detector system to improve image quality when a small object being examined is involved. FIGS. 12(A) and (B) illustrates in outline the method.

The CT processor shown in FIGS. 12(A) and (B) is assumed capable of rearranging the order of fan/parallel beams. In the CT processor, the interpolative operation is carried out from fan to parallel beams at a one-to-one ratio. When an object being examined is smaller, there will be certain channels which are not effectively utilized.

FIG. 12(A) illustrates such a case wherein, because an object being examined is smalled in diameter than the width of the fan beam from an X-ray source 1, blank channels are produced as shown by the slanted lines within the detector 1.

The distance between the X-ray source and object 3 is relatively shifted as shown in FIG. 12(B) to avoid the aforementioned phenomenon. Accordingly, all of the detector channels can be effectively utilized.

Nevertheless, the shifting mechanism is still required and this is disadvantageous.

OBJECT OF THE INVENTION

An object of the present invention is to provide a picture image processor in an X-ray computerized tomographic system capable or realizing the above effects during data processing without employing the aforementioned shifting mechanism.

Other objects and advantages of this invention will be apparent from a reading of the following specification and claims taken with the drawing.

SUMMARY OF THE INVENTION

The present invention effectively utilizes the outer channels during tomography intended for a small object, this being effected by scale-up interpolative operations to reconstruct picture images of good quality, as will be described in more detail below.

DETAILED DESCRIPTION OF THE PREFERRED EMBODIMENTS OF THE INVENTION

In the conventional X-ray CT operation for rearranging the order of fan/parallel beams, the fan/parallel beam interpolative operation is carried out at a one-to-one ratio. Consequently, channels occur which are not effectively utilized in the internal operating system as the object being examined becomes smaller.

When interpolation operations for rearrangement are carried out, a scale-up 1:n (n represents the scale-up ratio and n is any number and not necessarily an integer) interpolation operation is carried out to utilize certain channels which would otherwise not contribute to the reconstruction of the image. Increased memory buffering, if necessary, may also be employed, as described below.

A correction filter is used to effect a convolution operation after the scale-up interpolation operation. Alternatively, another filter correcting processes in the frequency range may be employed after the scale-up interpolation operation. When the image is reconstructed by means of reverse projection, an n:1 scale-down reconstructing operation is implemented to obtain the final CT image.

Figure 2:
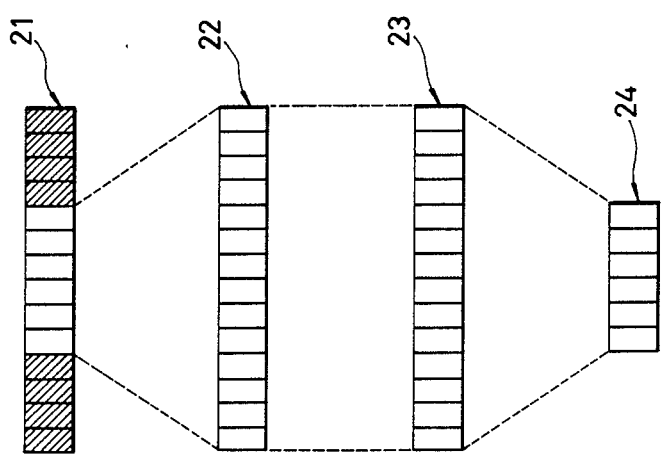
FIG. 2 illustrates changes in channels when scale-up interpolative operations are carried out according to the present invention.

FIG. 2 illustrates channel processing for image reconstruction using an X-ray detector system 21, wherein fan beams are detected. The blocks indicated by slanted lines represent channels normally not involved in the image reconstruction in prior art systems The scale-up interpolation is carried out when the fan/parallel beam rearrangement operation is applied to the data from the detector system 21. The scale-up interpolation is such that all the channels are effectively utilized. Numeral 22 shows the parallel channels obtained as the result of the scale-up interpolation. At that time, the memory buffering is increased, if necessary, to match the number of channels with the scale-up ratio n.

Subsequently, the sum obtained is subjected to convolution through a correcting filter $H(\omega) = |\omega|$ to obtain the data of the corrected channels 23. The data of the reversely projected channels 24 is effected by a scale-down interpolation proportional to the scale-up ratio of the scale-up interpolation to effect image reconstruction and obtaining the final CT picture image.

Figure 3:
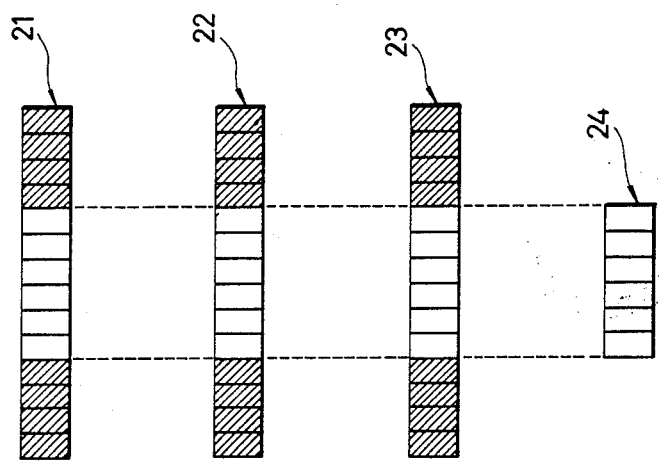
FIG. 3 illustrates changes in channels according to the conventional method.

FIG. 3 illustrates buffer channels utilization changes for a small object in the reconstruction process in a conventional case. Among detector channels 21, there are those (indicated by slanted lines on both sides) which do not contribute to image reconstruction when a small object is being examined. They are still present on both sides of a group of parallel channels 22 despite the fan/parallel beam rearrangement operation and also in a group of channels 23 passed through the convolution operation by means of the correcting filter $H(\omega) = |\omega|$. Thus, the slanted line channel data in no way contributes to the reversely projected data 24 at the time of image construction.

A description will now be given of how the present invention effects improvement in image quality by scale-up interpolation according to the present invention.

The interpolation will be described first. Interpolation means, when known values are discrete, a value at any point with respect to the known discrete data fk (k=1,2, ... N) defined therebetween is obtained from the data at both ends through predetermined operations. When a displacement from the discrete point k is designated $\delta$, where $0 \leq \delta \leq 1$, the unknown value, $f_{k+\delta}$, at the point $k+\delta$, is given by the equation $f_k + \delta = (1-) f_k + \delta f_{k+1}$ using a simple linear interpolation, for example. The value obtained is an estimated one and different from the actual value. Accordingly, there are used various interpolation functions to increase the precision expected.

The following are generally employed as an interpolation functions: the nearest approximation, linear approximation, least mean square approximation (secondary function), spline approximation, TRW (best cubic approximation), Lagrange approximation, etc. Those interpolation functions are adopted depending on the purpose.

Figure 4:
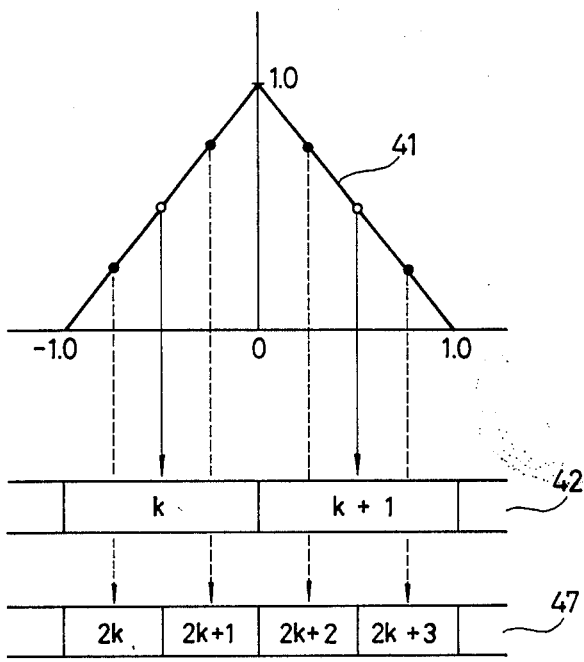
FIG. 4 illustrates the relation between a parallel beam channel pitch by equimultiplicating and double interpolations and an interpolative function.

FIG. 4 shows scale-up interpolation when linear interpolation is half of the pitch in the equimultiplicating interpolation, and it is utilized. The blank round marks indicate interpolating points when equimultiplicating interpolation is conventionally employed, whereas the black round marks designate interpolating points when double interpolation according to the present invention is preferably used. A pitch representing channels when the computed rearrangement of the order of fan/parallel beams is completed becomes such as shown by numeral 42 in the case of equimultiplicating interpolation and 43 in the case of double interpolation; in other words, the channel pitch width through the double interpolation appears obviously superior to the equimultiplicating interpolation in representing minute data.

Figure 5:
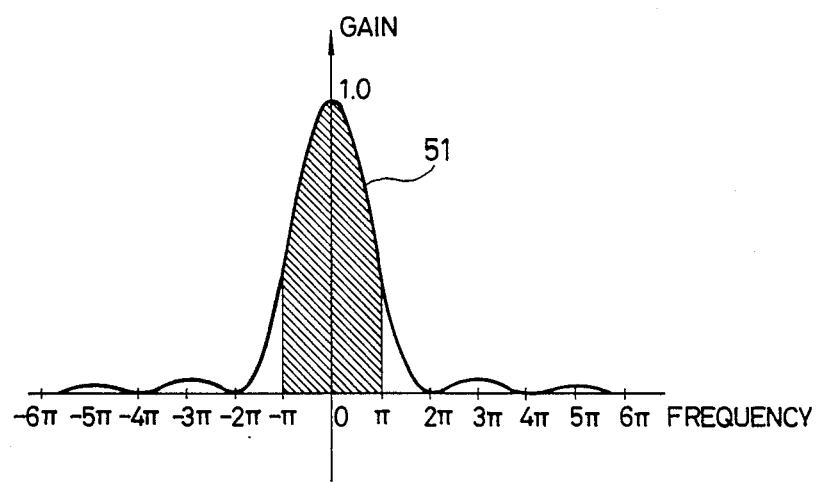
FIG. 5 illustrates the meaning of scale-up interpolation in view of the frequency characteristics of the interpolative relation.

FIG. 5 illustrates the above-described interpolation in the frequency range, wherein frequency characteristics of interpolative functions subjected to linear interpolation are indicated. The frequency range in FIG. 5 $[-\pi \sim \pi]$ will be described first.

Assuming the distance between the samples to be $\tau$, the Nyquist frequency is expressed by $$fc = \tfrac{1}{2}\tau \qquad (1)$$

i.e., the highest frequency is transmittable up to fc when the distance between the samples is $\tau$. Then it is expressed in a Nyquist frequency $\omega$ c by $$\omega c = 2\pi fc = \pi/\tau \qquad (2)$$

Accordingly, the angular frequency range transmittable becomes $[-\pi/\tau \sim \pi/\tau]$ when the sampling distance is $\tau$.

Assuming the interval $\tau$ as a unit distance, the distance can be expressed by $[-\pi \sim \pi]$. Hereinafter that expression is used to describe the following.

In FIG. 5, the range $[-\pi \sim \pi]$ with slanted lines indicated the frequency component transmitted by the rearrangement of the order of fan/parallel beams through the equimultiplicating interpolation. As the frequency component up to $[-n\pi \sim n\pi]$, n representing the scale-up ratio, is transmitted, the transmitted quantity of energy increases when n increases. However, because the increased quantity of energy will gradually decrease, as is obvious from FIG. 5, even if n is increased to 2, 4, 6 ... , n for practical use seems to be 2 or 4 for satisfactory use. With n above these values, the memory capacity required tends to increase sharply in comparison with the increased energy obtained and the systems become unpractical.

The second reason for improvement in the image quality lies in the fact that the use of scale-up interpolation for the rearrangement of the order of fan/parallel beams acts to make the channel pitch on the parallel beams minuter than those on the fan beams, so that the frequency range is multiplicable by the scale-up ratio n when the correcting filter of $H(\omega) = |\omega|$ is applied thereto.

The correcting filter of $H(\omega) = |\omega|$ will be described, subsequently. Assuming the distribution of X-ray absorptivity of an object to be f(x, y), the logarithmic conversion of a decrement of X-ray intensity at an angle of $\theta$, i.e., the projected data g(u, $\theta$) is expressed by $$g(u, \theta) = \int_{-\infty}^{\infty} f(u\cos\theta - v\sin\theta, u\sin\theta + v\cos\theta)dv \qquad (3)$$

In that case, there is the relation $$x = u\cos\theta - v\sin\downarrow$$
$$y = u\sin\theta + v\cos\theta \qquad (4)$$

between coordinates (x, y) and (u, v).

The two-dimensional Fourier transform applied to the frequency range ($\zeta$, $\eta$) of the functions f(x, y) on the coordinates (x, y) is expressed by $$F(\zeta, \eta) = \int_{-\infty}^{\infty} \int_{-\infty}^{\infty} f(x, y)\exp[-i(\zeta x + \eta y)]dxdy \qquad (5)$$

That is converted into polar coordinates ($\omega$, $\theta$) and expressed by $$\zeta = \omega\cos\theta$$
$$\eta = \omega\sin\theta \qquad (6)$$

This is substituted for the equation (5) and rewritten by $$F(\omega \cos\theta, \omega \sin\theta) = \int_{-\infty}^{\infty} \int_{-\infty}^{\infty} f(x, y) \cdot \quad (7)$$
$$\exp[-i\omega(x\cos\theta + y\sin\theta)]dxdy$$
$$= \int_{-\infty}^{\infty} \left( \int_{-\infty}^{\infty} f(u \cdot \cos\theta - v \cdot \sin\theta, u \cdot \sin\theta + v\cos\theta) dv \right) \cdot \exp(-i\omega u)du$$
$$= \int_{-\infty}^{\infty} g(u, \theta) \exp(-i\omega u)du$$

In order to obtain the distribution f(x, y) of the X-ray absorptivity of the object, an inverse Fourier transform is applied to the equation (7). In polar coordinates, they are expressed by the following:

$$f(x, y) = 1/8\pi^2 \int_0^{2\pi} \int_{-\infty}^{\infty} F(\omega\cos\theta, \omega\sin\theta) \cdot \exp[i\omega(x\cos\theta + y\sin\theta)]|\omega|d\omega d\theta \quad (8)$$
$$= 1/8\pi^2 \int_0^{2\pi} \left( \int_{-\infty}^{\infty} F(\omega\cos\theta, \omega\sin\theta), |\omega| \cdot \exp(i\omega u)d\omega \right) d\theta$$

As is obvious from the equations (7) and (8), the method of obtaining the distribution f(x, y) of the X-ray absorptivity of the object comprising the steps of subjecting the projected data g(u, θ) to the Fourier transform, applying the inverse Fourier transform thereto after the result obtained being operated by the finding of $H(\omega) = |\omega|$, and integrating the result obtained over the section $0 \leq \theta < 2\pi$. $H(\omega) = |\omega|$ in the equation (8) is called the correcting filter.

Figure 6:
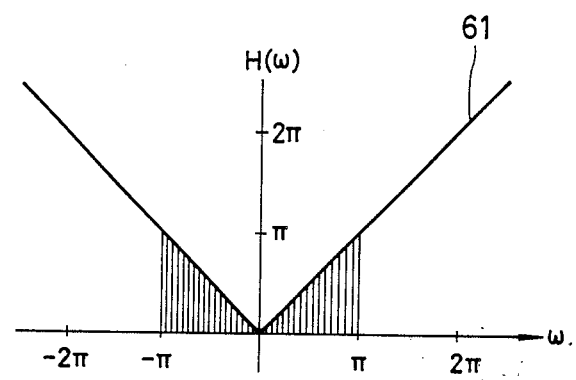
FIG. 6 illustrates characteristics of a correcting filter.

FIG. 6 shows the frequency characteristics of $H(\omega) = |\omega|$. The range wherein data is transmitted by means of equimultiplicating interpolation represents the portion indicated by hatching in the range $[-\pi \sim \pi]$. In the n-time interpolation, the data in the range $[-n\pi \sim n\pi]$ is transmitted and, provided that the scale-up ratio n is defined as n>1, a picture image including frequency components higher than those obtained by equimultiplicating interpolation is obtainable.

The correcting filter $H(\omega) = |\omega|$ shows ideal filter characteristics and the quantity of energy transmitted is large in the neighborhood of the Nyquist frequency ($\pi$ or $-\pi$ in the case of equimultiplicating interpolation) and, because noise is thus increased, it is needless to say preferable to use a correcting filter with frequency characteristics whose high frequency range is slightly lowered to actually conform to $H(\omega) = |\sin(\omega/2)|$.

The present invention will now be described in detail with an arrangement in concrete terms where the scale-up interpolative operation is carried out.

Figure 7A:
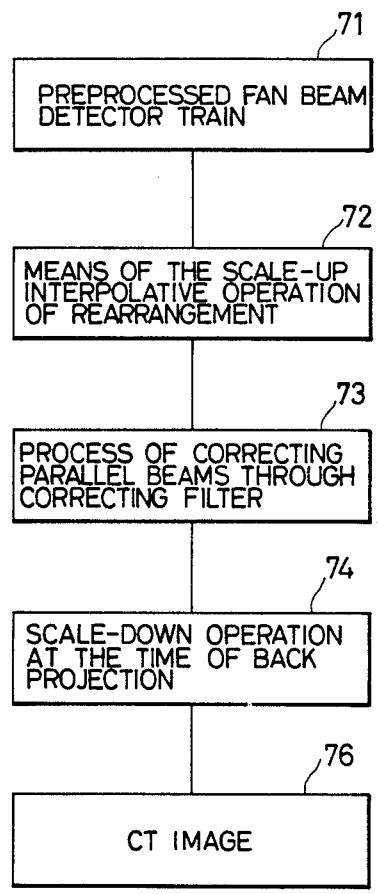
FIG. 7 illustrates a process chart for obtaining a picture image by rearranging the order of fan/parallel beams through scale-up interpolative operations in a fan beam X-ray CT.

The process of rearranging the order of fan/parallel beams accompanying the scale-up interpolation operation is implemented by two methods shown in FIGS. 7(A), (B) depending on whether or not the filter correction is provided first.

In FIG. 7(A), the data received from a preprocessed fan beam detector train (flow 71) is subjected to the rearrangement of the order of fan/parallel beams by means of the scale-up interpolative operation (flow 72) and the parallel beam data obtained is processed through the correcting filter (flow 73) to obtain the final CT image picture (flow 76) by the scale-down operation at the time of reverse projection (flow 74).

Figure 7B:
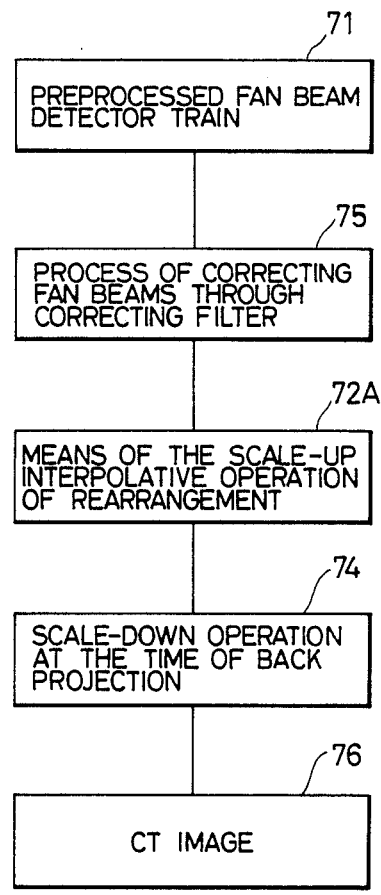

In FIG. 7(B), the fan beam data is processed through the correcting filter (flow 75) and then subjected to the rearrangement of the order of fan/parallel beams by means of the scale-up interpolative operation (flow 72A) to obtain the final CT image picture from the reverse projection (flow 74) accompanying the scale-down operation.

Figure 1:
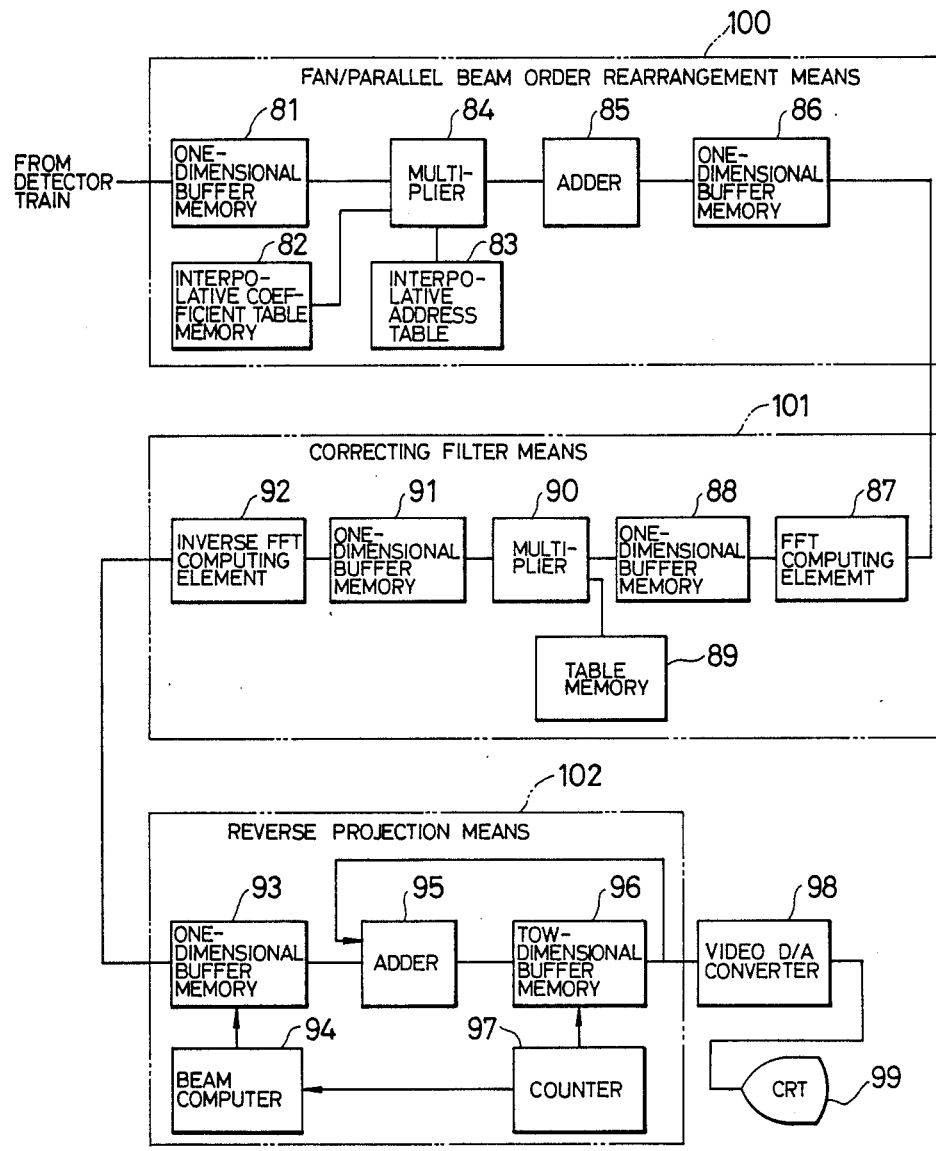
FIG. 1 illustrates an illustrative embodiment of the present invention.

FIG. 1 shows the embodiment of a processor for implementing the process of FIG. 7(A). The processor comprises fan/parallel beam order rearrangement means 100, correcting filter means 101, back projection means 102, a video D/A converter 98 and a CRT 99.

The fan/parallel beam order rearrangement means 100 comprises a one-dimensional buffer memory 81, an interpolative coefficient table memory 82, an interpolative address table 83, a multiplier 84, an adder 85 and a one-dimensional buffer memory 86.

The correcting filter means 101 comprises, FFT computing element 87, a one-dimensional buffer memory 88, a table memory 89, a multiplier 90, a one-dimensional buffer memory 91 and an inverse FFT computing element 92.

The back projection means 102 comprises a one-dimensional buffer memory 93, a beam computer 94, an adder 95, a one-dimensional buffer memory 96 and a counter 97.

The operation of the processor is as follows:

The data from the pre-processed fan beam detector train is stored in the one-dimensional buffer memory 81. The coefficient data for scale-up operations are stored in the interpolative coefficient table memory 82 and the scale-up interpolative address memory 83. When a fixed quantity of data is stored in the one-dimensional buffer memory 81, the interpolative coefficients are successively read out and they are stored in the one-dimensional buffer memory 86 as parallel beam data through the multiplier 84 and the adder 85.

For providing correction through the filter, there are provided two methods: one comprises subjecting the filter function to inverse Fourier transform and realizing what has been expressed in terms of an actual space through convolution; and the other comprising subjecting the one-dimensional data to the Fourier transform, effecting the product of the data and the filter function and again subjecting the product to the inverse Fourier transform. The present invention preferably employs the implementation of the correcting filter process using the latter.

The Fast Fourier Transform computing element 87 is used to convert the data rearranged into beams and stored in the one-dimensional buffer 88 into further a frequency range. The data obtained in 88 and the filter function held by the table memory 89 are multiplied in the multiplier 90 and then stored in the one-dimensional buffer memory 91. The result obtained is returned to the actual space region by the inverse FFT computing element 92.

The data thus obtained is stored in the one-dimensional buffer memory 93 and, according to the command of the counter 97, the scale-down beam computer 94 operates to take out the data corresponding to the scale-down operation, implement interpolative operations, store the data in the two-dimensional buffer memory 96 through an adder 95 and expressing the data through a video D/A converter 98 in the form of an image on the CRT 99.

Finally, a description will be given of the contents stored in the table/address memory of the scale-up interpolating factors and cf the tables for use in the scale-down beam computers.

Figure 8:
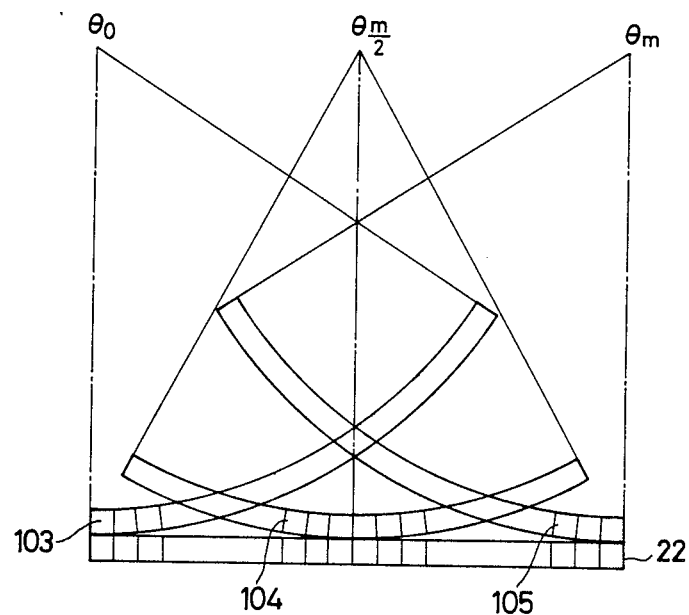
FIG. 8 illustrates a method of compution for obtaining parallel beam projected data.

FIG. 8 illustrates the method of computing the parallel beam projecting data obtaining from fan beam projection data in several angles through the rearrangement of the fan/parallel beams.

When one parallel beam projected data is formed, several groups of fan beam projected data are required because the fan beam projected data is measured from the detector train arranged on the radius R and the limited number of data usable out of fan beam projected data at an angle as an arc is projected on the tangent.

Figure 9:
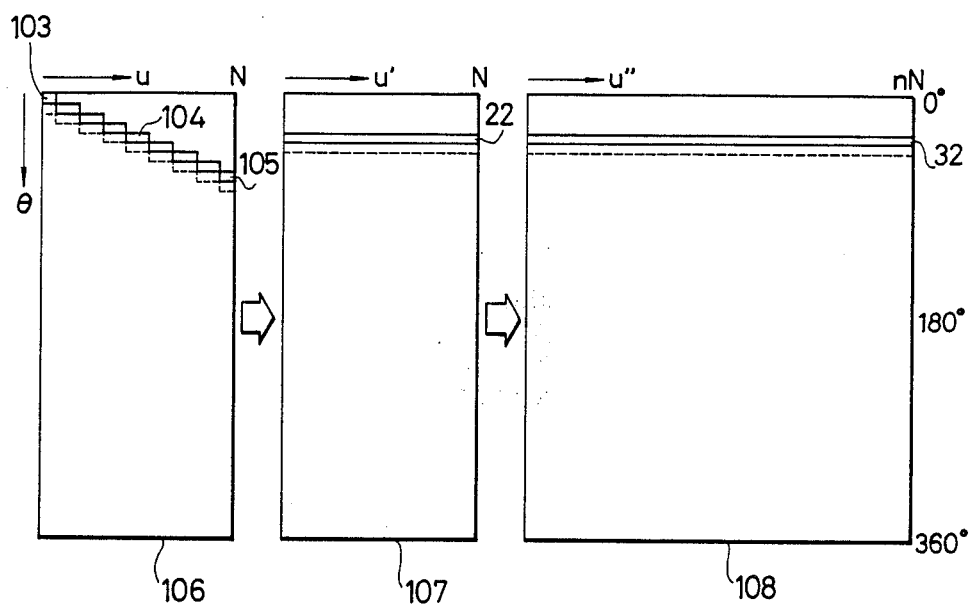
FIG. 9 illustrates a procedure for providing a group of scale-up interpolated parallel beam projected data.

FIG. 8 illustrates the method of forming one parallel beam projected data out of the (m+1) pieces of fan beam projected data at an angle ranging from $\theta o$ to $\theta m$. Assuming the one parallel beam projected data to be what corresponds to the central angle 74 m/2, the rearrangement of the order of fan/parallel beams is equivalent to constructing a group of fan beams by shifting the angle on a unit angle basis with the $\theta m/2$ as a central figure. FIG. 9 shows the aforementioned situation.

When the fan beam projected data is represented by $S(u,\theta)$ and the parallel beam projected data, by $g(u',\theta)$, the data of u, u' and $\theta$ are represented by the following equations with integers k and j as the measured data are quantized by sampling intervals $u_p$, $u_p'$ and $\theta_p$, respectively, $$\left. \begin{array}{l} u = u_0 + k \cdot u_p = u_k \\ u' = u_0' + k \cdot u_p' = u_{k'} \end{array} \right\} k = 0, 1, --, N - 1 -- \quad (9)$$

$$\theta = \theta_o + j \cdot \theta_p = \theta_j, j=0, 1, -, M-1 \quad (10)$$

$$M = 2\pi/\theta_p \quad (11)$$

wherein $u_o$ designates the position of the first detector for fan beam and $u_o'$ for parallel beam; k, detector number, $\theta_o$, the measuring starting angle; j, projection number; N, the number of detectors; and M, the number of projection angle. Fan/Parallel beams order rearrangement means is performed by the following equations.

$$g(u_{k'}, \theta_j) = \sum_{i=-1}^{2} a(k + l, i(k + l)) \cdot S(u_{k+l}, \theta_{j+i}) \quad (12)$$

Here, k=1, --, N−2 j+i=0, 1, --, M−1, (Mod M)

a(k, i(k)) represents an interpolative function in the Fan/Parallel beams order rearrangement means. The above example is described for four points interpolation. Here, k designates detector number and i (k), the relative projection number Furthermore, i(k) is the function of k. The above described relationship is shown in FIG. 8. As i(k) varies by one projection angle each time several numbers of k change to other numbers of k in correspondence with the projection angle, parallel beam projected data 22 as shown in FIG. 8 are obtained by computing interpolated values according to the variation of i(k) with the equation (12). In the equation (12), the demand for the interpolation is caused by the fact that as the positions of the detectors for fan beam and parallel beam do not perfectly coincide with each other, a difference of detecting positions of the detectors occur according to the difference in geometry between fan and parallel beams detection. In this example, parallel beam projected data are obtained by interpolating with fan beam projected data of four points approximate to a target point.

Furthermore, $g'(u'',\theta)$ represents the projected data which is obtained by effecting scale-up interpolative operations on the parallel beam projected data obtained as described above, and the four points interpolation as described above is employed as an interpolative function for the scale-up interpolation. When $b(\delta,l)$ represents the interpolative function for the scale-up interpolation, $g'(u'',\theta)$ is obtained by the following equations.

$$g'(u''(k), \theta_j) = \sum_{l=-1}^{2} b(\delta, l) g(u'(k + l), \theta_j) \quad (13)$$

k'=0, 1, --, [nN]−1

$$u''=u'/n \quad (14)$$

$$k=[u''/u_p']=]u'/nu_p'] \quad (15)$$

$$k'=[u''/u_p'']=[u'/u_p'] \quad (16)$$

[] represents Gauss' notation

Substituting the equation (13) into the equation (12), $$g'(u''(k), \theta_j) = \quad (17)$$

$$\sum_{l=-1}^{2} \sum_{l=-1}^{2} a(k + l, i(k + l)) \cdot b(\delta, l') \cdot S(u_{k+l}, \theta_{j+i})$$

The equation (17) indicates that Fan/Parallel beam order rearrangement means can be performed at these same time when the scale-up interpolative operation is effected. Values of the coefficients a(k,i)·b(δ,l) in the equation (17) are memorized in the interpolative coefficient table memory 82 in FIG. 1. Data representative of the position relationship of k+l with i and the relationship of δ with l' are memorized as address data in the interpolative address table 83. Fan/Parallel beams order rearrangement means 100 as shown in FIG. 1 is carried out as described below. In practice, the number of buffer memories in the one-dimensional buffer memory 81 is set according to the spread out angle of the fan beam, that is, the number of change of i in the equation (17). Each time the projection angle θ changes by a unit of angle, proceeding stored data in the one-dimensional memory are eliminated and the newest data are substituted for the proceeding stored data. Those data are corresponded to S in the equation (17). After contents of a(k,i)·b(δ,l) are accessed from the interpolative coefficient table memory 82 and the interpolative address table 83, the product of a(k,i) b(δ,l). S is made by the multiplexer 84. The product must be added four times respectively with respect to l and l'. This adding operation is performed by the Adder 85. g'(u''',θ_j) represents the value obtained by the Adder 85, and is memorized in one-dimensional buffer memory 86 to be transferred to the next process.

FIG. 9 shows the procedure for forming a group of parallel beam projected data 107 obtained through computation from a group of fan beam projected data 106 and a group of parallel beam projected data 108 subjected to scale-up interpolation. One of the parallel projected data 22 is obtained from the group of fan beam projected data and, as shown in FIG. 8, partial data 103, 104, 105 corresponding to several angles through the rearrangement of the fan/parallel beams. Subsequently, the value obtained is scaled-up and interpolated to obtain the scaled-up parallel beam projected data 32. Since the rearrangement of the fan/parallel beams is a sort of interpolation, the series of processes can be provided collectively. In a practical process, a method in which the group of the scale-up parallel beam projected data is directly computed from the group of the fan beam projected data is adopted.

There will subsequently be described scale-down reconstructing operations at the time of reconstructing the final CT picture image after the application of the correcting filter means.

Figure 10:
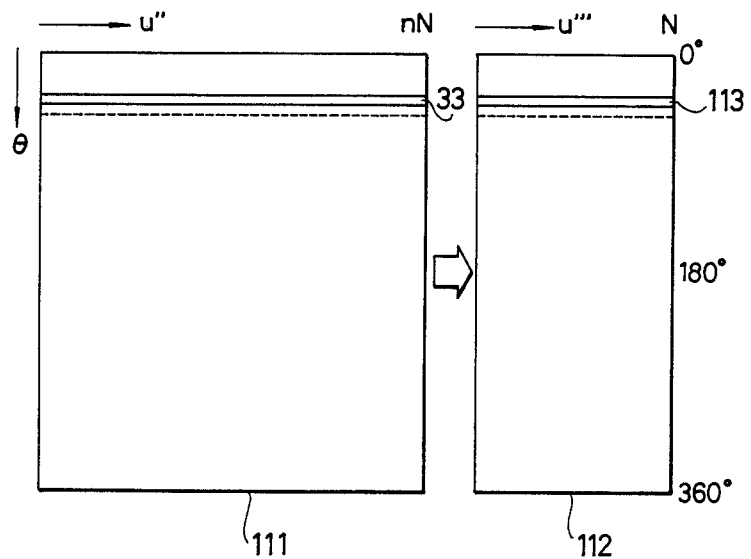
FIG. 10 illustrates a process for scaling down the group of scale-up parallel beam projected data.

FIG. 10 illustrates a process for scaling down the group of scaled-up parallel beam projected data. To obtain the group of parallel beam projected data 112 scaled down to the original size from the group of parallel beam projected data 111 subjected to the correcting filter process only by computation, an interpolative function is used to obtain an approximate value through computation opposite to the scale-up interpolation. $P(u'', \theta)$ represents the data after correcting filter means and $P'(u'', \theta)$, scale-down interpolated data thereof. When the function employed in these scale-up interpolation is employed in the scale-down interpolation as an interpolative function, a scale-down interpolation process is performed by the following equations.

$$P'(u''', \theta) = \sum_{l=-1}^{2} b(\delta, l) \cdot P(u''(k + l), \theta) \quad (18)$$

$$u''' = nu'' \quad (19)$$

$$k = [u'''/u_p''] = ]nu''/n_p''] \quad (20)$$

$$\delta = u''' - ku_p'' \quad (21)$$

That process results in the acquisition of scaled-down parallel beam projected data 113 after the correcting filter process. The data is employed to carry out a back projection process corresponding to the angle θ at the time of measurement.

Figure 11:
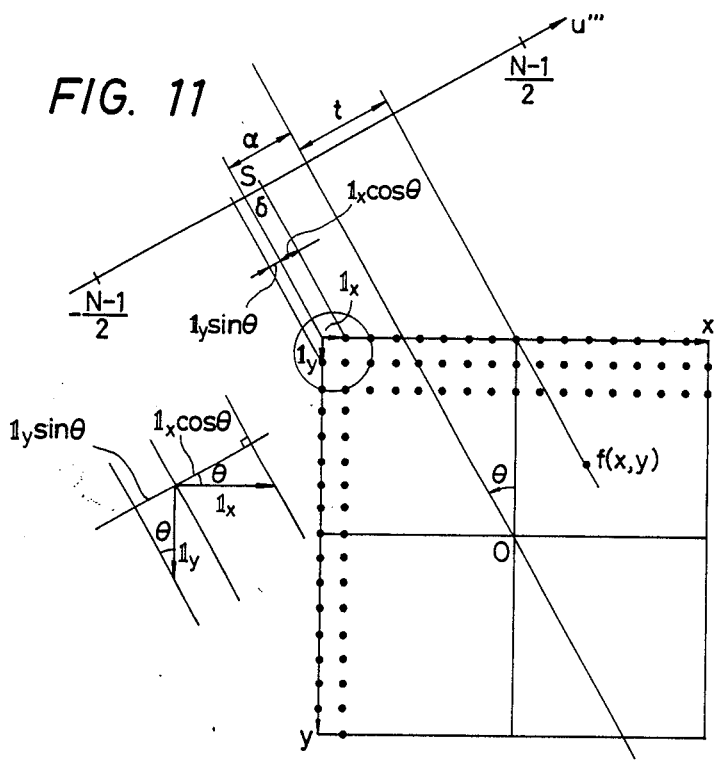
FIG. 11 illustrates an inverse projection process.
Figures 12A, 12B:
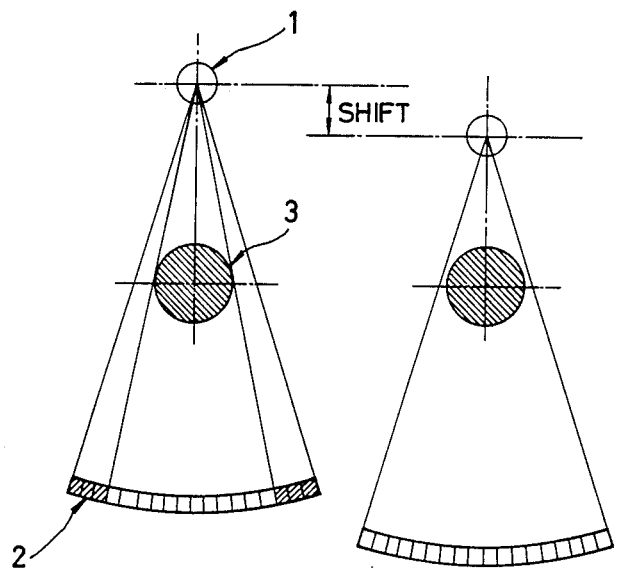
FIGS. 12(A and B) illustrates the operation of a conventional CT processor.

FIG. 11 illustrates the back projection process. Assuming independent coordinates perpendicular to each other of unit vectors to be 1x and 1y, the coordinates being determined by a unit distance of a picture element of the CT image to be reconstructed, the projections of the vectors on the parallel beam projected data after the correcting filter process are 1x·cosθ and 1y·sinθ, respectively. In other words, a back projected value separated from the center by α is obtained by interpolation on the parallel beam projected data axis u''' when the start point of CT image reconstruction is placed on the upper left corner and the value obtained should be added to the picture element on the CT picture image. For a picture element f(x, y) on any given point (x, y) of the CT picture image, the interpolated value of a point separated from the start point S on the parallel beam projected data by (α+t) should be added to f(x, y), wherein t represents the length of a vertical line from the originating point O on the u'''-axis toward a straight line in parallel to the angle θ and passing the point (x,y).

To obtain a back projected value at any point on the CT picture image, the data projected on u''' every 1x·cos θ or 1y·cos·θ, which is a projected component of unit vector 1x, 1y on CT image onto the parallel beam projected axis u''', is interpolated and used as back projected value. Accordingly, as the parameter required for the back projection process, the position α on the start point S of the parallel beam projected data axis and the values and 1x·cosθ and 1y·sinθ components, the processes in FIGS. 9 and 10 are collectively carried out, reverse projection process according to a practical process will be describes below. In order to reconstruct an image picture from scaled-down parallel beam projected data $P'(u''', \theta)$, each value of $P'(u''', \theta)$ over all projection angles is added to each other one by one according to the following equation (22):

$$f(x, y) = \sum_{\theta=0}^{2\pi} P'(u''', \theta)d\theta, \quad (22)$$

wherein f(x,y) represents image data. By substituting the equation (18) into the equation (22), the following equation (23) is obtained.

$$f(x, y) = \sum_{\theta=0}^{2\pi} \sum_{l=-1}^{2} b(\delta, l)P(u''(k + l), \theta)d\theta \quad (23)$$

the equation (23) indicates that the scale-down interpolation process and the inverse projection process can be performed collectively. In the beam computer 94, a value of b(δ,l) in the equation (23) is accessed according to the equations (19), (20) and (21), and furthermore $P(u''(k+l), \theta)$, the content in one-dimensional buffer memory 93 is multiplied by the value of b(δ,l). In the adder 95, the value obtained is added to the value of f(x,y) in two-dimensional buffer memory 96, which is the sum of the values operated by the adder 95 over the proceeding projection angles.

A CT image picture is obtained by effecting the above operations over 360 degrees of the projection angles, More concretely, by computing in advance the values of 1x·cosθ and 1y·sinθ according to the temporary number (nN) of the detectors in a group of the parallel beam projection data 111 in FIG. 10, the scale-down interpolative process and inverse protection can be performed collectively.

The embodiment of the present invention illustrates a case wherein the width of the object being examined is smaller than that of the fan beam. Even in the case of an object having roughly the same width as that of the fan beam, the present invention is applicable to a method for scaling up a multichannel detector having a greater number of internal operational channels than that of the actual multichannel detector.

According to the present invention, because picture quality equivalent to what is obtained from the use of a complicated shift mechanism can be secured without using the mechanism, it is not only efficient economically but also capable of improving picture quality compared with the conventional apparatus Given a 1:n scale up ratio for the fan/parallel beam rearrangement operation and a Nyquist frequency fc with which the original fan beam data is supplied, picture quality having the frequency range up to nfc can be obtained.

I claim:

1. In a CT picture image processor for use in X-ray computerized tomograph including an X-ray source for providing fan beams on an object being examined; a multi-channel X-ray detector for detecting said fan beams transmitted through said object; and processing means for reproducing a sectional image bf said object by a back projection of the signal obtained from said multi-channel X-ray detector, the improvement comprising;

said processing means including rearranging means for rearranging the order of projected data corresponding to said fan beams into plural neighboring rearranged projected data corresponding to parallel beams; and interpolative means for effecting interpolative operation on said plural neighboring rearranged projected data so as to use the interpolated data for said back projection, said interpolative means comprising means for scaling up said interpolative operation by a 1:n factor where n may be any rational number and wherein the value of n is related to a width dimension of the object being examined.

2. The improvement as in claim 1 where said means for obtaining said back projection includes means for scaling down the input signal to the back projection means, the latter input signal be scaled down by a n:1 factor.

3. The improvement as in claim 1 where said processing means includes a correction filter means for effecting a convolution operation with respect to the input signal to the back projection means.

4. The improvement as in claim 3 where said correction filter means is performed prior to said means for rearranging the order of the fan beams into parallel beams.

5. The improvement as in claim 3, wherein said correction filter means is responsive to the data preprocessed from said multichannel x-ray detectors.

6. The improvement as in claim 1, wherein said processing means comprises rearranging and interpolating means for integrally performing both functions of said rearranging means and said interpolative means.

* * * * *